Figure 1:
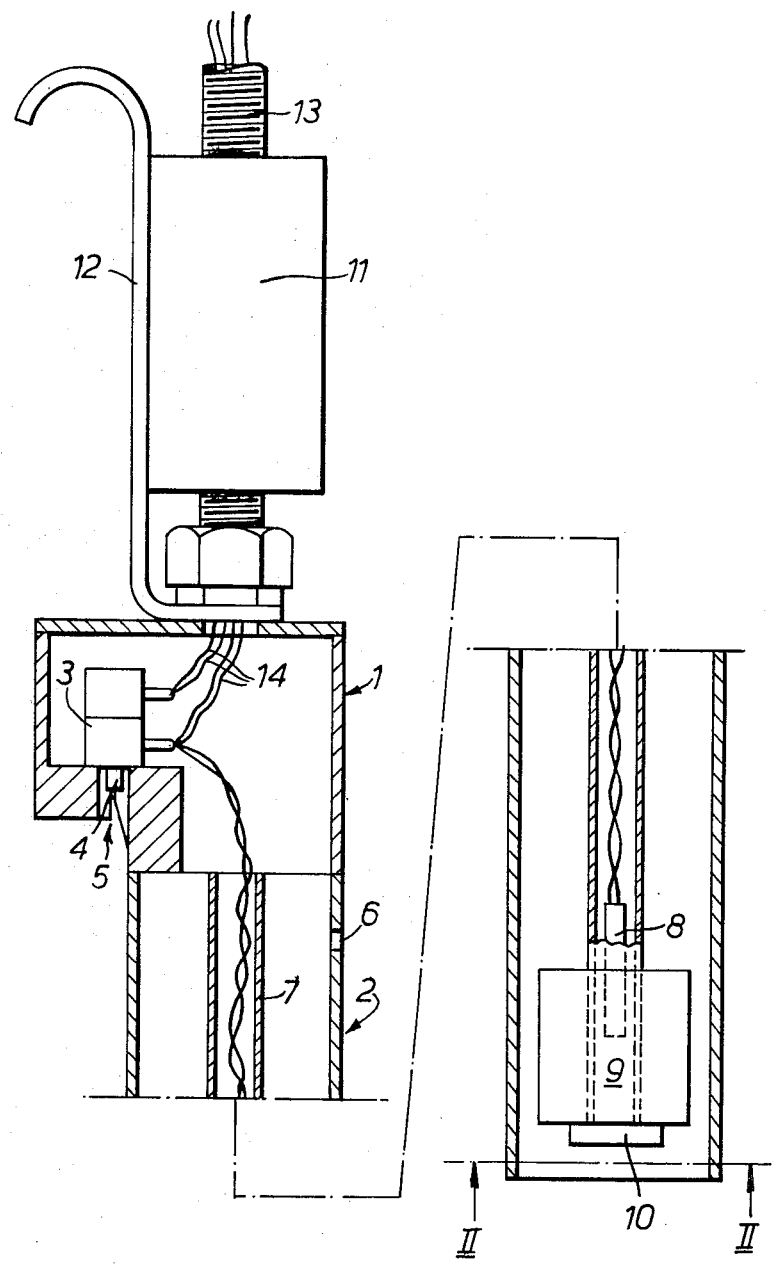

United States Patent [19]

Shackcloth

[11] 4,297,543
[45] Oct. 27, 1981

[54] SAFETY DEVICE FOR CONTAINER FILLER SYSTEMS

[75] Inventor: Barry Shackcloth, Harpenden, England

[73] Assignee: Total Oil Great Britain Limited, London, England

[21] Appl. No.: 21,807

[22] Filed: Mar. 19, 1979

Related U.S. Application Data

[63] Continuation of Ser. No. 844,041, Oct. 20, 1977, abandoned.

[30] Foreign Application Priority Data

Oct. 22, 1976 [GB] United Kingdom ............... 43956/76

[51] Int. Cl.³ .......................................... H01H 35/18
[52] U.S. Cl. ................................. 200/18; 200/84 R; 200/330; 200/334; 340/624
[58] Field of Search ............... 340/612, 618, 623, 624; 73/308, 313, 319; 200/61.2, 84 R, 84 C, 153 LA, 153 T, 294, 329–331, 81 R, 81.4, 81.5, 5 A, 18, 334

[56] References Cited

U.S. PATENT DOCUMENTS 4,020,481 4/1977 Nakagawa ......................... 200/84 C
4,056,979 11/1977 Bongort ............................ 200/84 C

FOREIGN PATENT DOCUMENTS 1249640 10/1971 United Kingdom ............... 200/61.2

Primary Examiner—Gerald P. Tolin
Attorney, Agent, or Firm—Sigalos & Levine

[57] ABSTRACT

A safety switch assembly for use in filling a gasoline products tanker and having a body portion and a gasoline level sensing portion. A channel (part-circular in plan) in the body portion fits over the rim of the filler opening of the tanker to enable the rim to actuate a first electrical switch contained in the body portion. The sensing portion projects into the filler opening and includes a reed relay and a float carrying a magnet to actuate the reed relay. The first electrical switch is a double pole microswitch having one pole normally open and the other pole normally closed. The normally open pole is connected to delivery apparatus to prevent delivery unless the rim actuates the microswitch. The normally closed pole is in parallel with the reed relay which has its contacts closed when the float is unactuated. When the gasoline level nears the top of the container the float rises to de-actuate the reed relay and disable the delivery system to prevent spillage. Spring-biased pivotally mounted lugs are provided to hold the assembly on the rim of the filler opening.

7 Claims, 4 Drawing Figures

SAFETY DEVICE FOR CONTAINER FILLER SYSTEMS

This is a continuation, of application Ser. No. 844,041, filed Oct. 20, 1977, now abandoned.

This invention relates to safety switch assemblies.

It is well known that the spillage of gasoline products creates a very dangerous fire hazard and that this problem is particularly acute in the case of the filling of gasoline products tankers because of the large quantity of gasoline products involved.

Gasoline products tankers in use today comprise a number of compartments with a filler opening at the top of each compartment. The practice has been for the driver of a tanker to fill the compartments of his tank at a gasoline products terminal by means of an automatic delivery system. The driver inserts the appropriate loading arm into the compartment to be filled, and initiates the delivery system. It will be clear that spillage can result for several reasons for example, the driver sets the delivery incorrectly, the capacity of the compartment is less than its nominal capacity, or the delivery system fails to stop automatically. As delivery rates of 2,300 liters/min are used, it will be understood that spillage for even a very short time can create a serious hazard. Not only is a serious hazard created but furthermore the loading bay and tanker (and even adjacent equipment) are put out of section until the spillage is removed. It is therefore very important that spillage should be avoided by the provision of some safety device.

A further problem is that of ensuring that a safety device, once provided, is used.

U.K. Patent Specification No. 1,249,640 describes a container filling apparatus for filling a tank compartment of a tank vehicle used for distributing hydrocarbon fuel. The known apparatus includes a liquid supply control device comprising a tube adapted to depend into the compartment, a first switch adapted to be switched by engagement of the device with a co-operating part of the compartment, and a second switch adapted to be switched by liquid within the compartment rising to a predetermined level in the tube. One form of the known device requires an L-shaped member to be secured to a peripheral wall of the manhole of the tanker. It is inconvenient to have to make a temporary fixing of an L-shaped member every time the device is to be used and on the other hand the permanent provision of an L-shaped member in every manhole of every tank vehicle is expensive and obviously has to be pre-arranged with the owner of the tanker. Another form of the known device has a hinged lower part adapted to sit on a dip-stick orifice in order to actuate the first switch. Alternatively, the hinged lower part may be attached to a laterally extending support rod to engage the structure surrounding an orifice through which the tube is to be inserted. Because both of these alternatives are inconvenient the operator may actuate the first switch by some other means than the intended one and so nullify the protection provided by the device.

The present invention provides a safety switch assembly for use with equipment for filling a container, the safety switch assembly comprising a body portion housing a first electrical switch operative to respond to the location of the body portion on a container to be filled and a sensing portion housing a second switch operative to respond to the level of contents in a container to be filled, wherein the first switch is so positioned on the body portion that location of the body portion on a rim of a peripheral wall defining a filler opening of a container to be filled is operative to cause engagement of the first switch with said peripheral wall to change the switch state of the first switch.

The body portion can be provided with a channel to receive a part of a rim of a peripheral wall defining a filler opening of a container. The axis of the channel preferably defines part of a circle to enable it to receive a part of a circular rim of substantially the same radius.

The body portion can include gripping means resiliently biased into the channel such that when, in use, the body portion is located on the rim, the rim is gripped between a wall of the channel and the gripping means. The gripping means can comprise one or more lugs projecting from a wall of the channel the or each lug being spring biased into the channel. The or each lug can be pivotally mounted on the body portion.

The first switch can comprise a normally open micro-switch having an actuating portion located in the channel.

Alternatively the first switch can be a double pole micro-switch having one pole of the switch normally open and the other pole of the switch normally closed.

The second switch can be a normally open switch actuable by a float which in turn is actuable, in use, upon overfilling of the container. The normally open switch can be a reed relay, the contacts of the relay being closed in the unactuated position of the float.

In the case where the first switch is a double pole switch the normally closed pole of the first switch can be electrically connected in parallel with the second switch.

A container filling system can comprise an electrically controlled delivery system settable for delivery of a predetermined quantity and a safety switch assembly as defined above electrically connected to control the delivery system.

Figure 2:
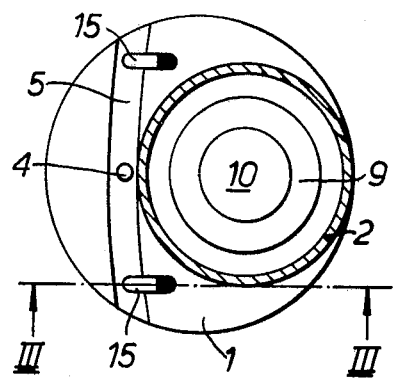
Figure 3:
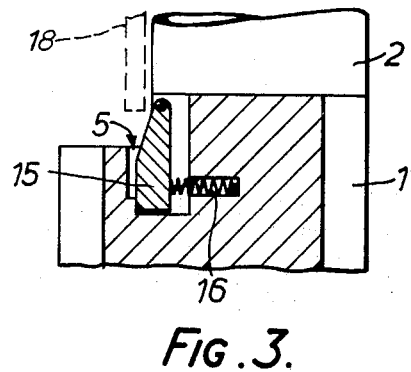
Figure 4:
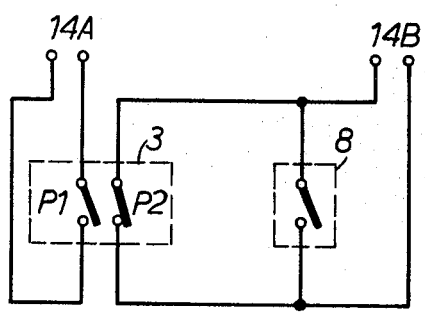

By way of example only, an illustrative embodiment of the invention will now be described with reference to the accompanying drawings, in which:

FIG. 1 shows diagrammatically in part cross-section a safety switch assembly embodying the invention, FIG. 2 shows a view of the switch assembly along the lines II—II of FIG. 1, FIG. 3 shows a sectional view of part of the switch assembly along the lines III—III of FIG. 2, and FIG. 4 shows the electrical circuit diagram of the switch assembly.

The safety switch assembly shown in the drawings comprises a generally circular body portion 1 on which a hollow tube 2 is eccentrically mounted. A double pole micro-switch 3 is mounted within the body portion 1 and has an actuating button 4 located in a part-circular channel 5 (see FIG. 2). The channel 5 is so shaped as to be positionable over the rim of one of the filler openings of a gasoline tanker and when so positioned the rim of the filler opening actuates the micro-switch 3 by means of the button 4.

As is most clearly seen in FIGS. 2 and 3, a pair of brass lugs 15 are located at opposite ends of the channel 5. Each lug is pivotally mounted on the body portion 1 and spring biased into the channel 5 by a respective spring 16 located in a bore in the body portion 1. Each lug has an inclined camming surface 17.

The hollow tube 2 has a vent hole 6 towards its upper end and within the tube 2 is another tube 7 of a non-magnetic material. Within the tube 7 and towards its lower end is positioned a normally open reed relay 8. An annular float 9 containing a co-axial annular magnet (not shown) is located for sliding movement along the tube 7. An end cap 10 maintains the float 9 captive on the tube 7.

A handle assembly comprising a partly rounded block 11 and a handle 12 is bolted to the top of the body portion 1. A flexible conduit 13, housing leads 14 from the micro-switch 3 and reed relay 8, passes out of the body portion 1 and through the block 11 of the handle assembly.

The electrical connections of the micro-switch 3 and reed relay 8 are shown in FIG. 4. One pole (P1) of the micro-switch 3 is connected to leads 14A which form one switch output of the circuit. The other pole (P2) of the micro-switch 3 is connected in parallel with the reed relay 8 and the parallel combination is connected to leads 14B which form a second switch output of the circuit.

The body of the safety switch is made of metal and the switches employed are of an encapsulated shock resistant type. Preferably the switches and wiring are potted in an insulating material such as an epoxy resin.

The operation of the safety switch assembly will now be explained.

The leads 14A from the micro-switch 3 are connected to the circuit of an automatic delivery system such that gasoline is not deliverable when an open circuit exists between the leads 14A. The pole (P1) of the micro switch 3 to which the leads 14A are connected is a normally open switch which is closed upon depression of the actuating button 4. In a vertical float down position the float actuates the reed relay 8 holding the contacts of this switch closed. Thus, when the actuating button 4 is not operated there is an open circuit between the leads 14A preventing gasoline supply, and there is a closed circuit between the leads 14B (both the micro-switch (P2) and the reed relay being closed).

In use, the operator takes the safety switch assembly and places it in position on the vertically extending rim of a filler opening of a compartment of a gasoline products tanker. During this operation the filler opening cammingly engages the surfaces 17 of the brass lugs 15 causing them to pivot away from the channel 5 and also actuates the micro-switch 3. In this position the safety switch assembly is securely gripped on the filler opening between one wall of the channel 5 and the brass lugs, with a closed circuit between the leads 14A and a closed circuit between the leads 14B (the micro-switch (P2) being open and the reed relay being closed). The operator then sets the delivery system to deliver the required compartment load.

Gasoline is delivered by the pump until either the required delivery is completed or (if the volume to be delivered is greater than the capacity of the compartment) until the level of liquid in the compartment causes the float 9 to rise. As the float rises, the magnet within it deactuates the reed relay 8 to produce a state of open circuit between the leads 14B thus stopping the delivery of petrol and so preventing spillage.

It will be seen that the delivery of gasoline is prevented if the operator fails to fit the safety switch on the filler opening and if the gasoline level exceeds a predetermined level. By this means, not only is a safety measure provided but its use by the operator is ensured.

The provision of a switch in parallel with the reed relay prevents false switching of this circuit. If for example the safety switch is inverted the float 9 may drop down the tube 7 thus opening the reed contact. However, in this case the pole (P2) of the micro-switch 3 in parallel with the reed relay will be closed (the actuating button 4 being unoperated) so that a closed circuit is maintained between the leads 14B and false disabling of the delivery system is prevented. If such a precaution is not required then the second pole (P2) of the micro switch 3 can be omitted.

In most applications it is desirable to connect the leads 14A such that an open circuit between these leads disables only the filling of the particular compartment in which the safety switch is located and to connect the leads 14B such that an open circuit between these leads disables all filling operations. If such an arrangement is not desirable then the leads 14A and 14B may be connected in series and the switch state of the series combination used to control the filling apparatus.

It should be understood that the described embodiment can be modified in various ways. For example, the reed relay 8 and float 9 could be replaced by a thermistor type level gauge. Any alternative switch system should preferably be fail safe. The safety switch can also be used for other substances besides gasoline products. The body and tube could be made of plastics material instead of metal and leads from the safety switch assembly could take the form of a multi-core cable in a protective sheath. The block 11 and handle 12 could be replaced by a unitary handle and top-plate for the body portion 1, the handle taking the form of an elongate boss on the top-plate with the leads passing through and clamped within it.

What is claimed is:

1. The combination of a safety switch assembly and a container for use with equipment for filling said container with a liquid, the combination comprising:
  a. a container having a protruding peripheral wall rim defining a filler opening,
  b. a switch assembly including a body portion having a first electrical switch and also having an elongated channel therein detachably receiving at least a segment of said peripheral wall rim of said container,
  c. said first electrical switch having an actuator housed in said elongated body portion channel and operative to respond to the insertion of the peripheral wall rim segment of said filler opening into said elongated channel of said body portion whereby said first switch is actuated when said body portion is mounted on said filler opening peripheral wall rim to allow said liquid to enter said container, and
  d. a sensing portion attached to said body portion and housing a second switch electrically connected with said first switch and operative to respond to the level of the liquid content in said container to be filled whereby said second switch is actuated and delivery of said liquid to said container is stopped when a predetermined liquid level in said container is reached.

2. A Safety Switch Assembly as claimed in claim 1 wherein said first switch is a double pole micro-switch having one pole of the switch normally open and the other pole of the switch normally closed.

3. A safety switch assembly as claimed in claim 1, wherein the body portion includes gripping means resiliently biased into the channel such that, the body portion is located on the rim, and the rim is gripped between a wall of the channel and the gripping means.

4. A safety switch assembly as claimed in claim 1, wherein the gripping means comprises at least one lug projecting from a wall of the channel, said at least one lug being spring biased into the channel.

5. A safety switch assembly as claimed in claim 4, wherein said at least one lug is pivotally mounted on the body portion.

6. The combination of a safety switch assembly and a container for use with equipment for filling said container with a liquid, the combination comprising:
   a. a container having a protruding peripheral wall rim defining a filler opening,
   b. a switch assembly including first and second switches having actuators and being electrically connected in series with each other,
   c. said switch assembly including a body portion having an elongated channel therein detachably receiving at least a portion of a segment of said filler opening protruding peripheral wall rim, said first switch actuator being located in said elongated channel and being normally in a first state and being actuated to a second state when said rim segment is inserted in said channel, and
   d. a liquid level sensing portion attached to said body portion inserted into said filler opening, said second switch being in said sensing portion and being normally in a first state and being actuated to a second state by said liquid rising in said container above a predetermined level whereby both of said first and second switches are actuated to a second state to cause said equipment to deliver said liquid to said container only when said assembly is mounted on said protruding peripheral filler opening wall rim and said liquid is below a predetermined level in said container and said liquid delivery is stopped whenever said device is removed from said protruding peripheral filler opening rim or said liquid level in said container rises above said predetermined level.

7. The combination of a safety switch assembly and a container for use with equipment for filling said container with a liquid, the combination comprising:
   a. a container having a protruding peripheral wall rim defining a filler opening,
   b. first and second switches each having an actuator and a first and second electrical state and electrically connected with each other,
   c. a switch assembly including a body portion having an elongated channel therein detachably receiving at least a segment of said filler opening protruding peripheral wall rim, said first switch actuator being located in said elongated channel and being normally in said first electrical state and being switched to a second electrical state when said rim is inserted in said channel, and
   d. a liquid level sensing portion attached to said body portion and inserted into said filler opening, said second switch in said sensing portion being normally in a first electrical state by and being switched to a second electrical state by said liquid rising in said container above a predetermined level whereby the electrical state of both of said first and second switches is switched to cause said filling equipment to deliver said liquid to said container only when said device is mounted on said protruding peripheral filler opening wall rim and said liquid is below a predetermined level in said container and said liquid delivery is stopped whenever said device is removed from said protruding peripheral wall rim or said liquid level in said container rises above said predetermined level.

* * * * *